United States Patent [19]

Brixner et al.

[11] 3,895,157

[45] July 15, 1975

[54] ALKALI METAL TITANATE REFLECTIVE UNDERLAYER

[75] Inventors: Lothar Heinrich Brixner, West Chester; Stanley Hancock Patten, Towanda, both of Pa.

[73] Assignee: E. I. du Pont de Nemours and Company, Wilmington, Del.

[22] Filed: Feb. 20, 1973

[21] Appl. No.: 333,545

Related U.S. Application Data

[63] Continuation of Ser. No. 126,362, Mar. 19, 1971, abandoned.

[52] U.S. Cl. ............... 428/220; 106/299; 428/469; 428/537; 428/913; 160/191; 250/71 R; 250/80; 252/301.3 P
[51] Int. Cl. ............................................. C09k 1/00
[58] Field of Search.......... 117/335 RT, 152, 169 R; 250/71 R, 80; 106/299; 252/301.3 P; 161/191

[56] References Cited
UNITED STATES PATENTS

| | | | |
|---|---|---|---|
| 2,648,013 | 8/1953 | Smith | 117/33.5 R |
| 2,819,183 | 1/1958 | Alles | 117/33.5 R |
| 3,023,313 | 2/1962 | De La Mater | 250/80 |
| 3,258,392 | 6/1966 | Brill et al. | 252/301.3 R |
| 3,331,658 | 7/1967 | Lewis et al. | 106/299 |
| 3,380,847 | 4/1968 | Lewis et al. | 117/169 |

*Primary Examiner*—William R. Trenor

[57] ABSTRACT

The invention comprises x-ray radiographic screens which contain a novel reflective layer composed of discrete particles of potassium titanate dispersed in a suitable binder and coated between the base support and the phosphor coating of the screen. This novel reflective layer improves the efficiency of the phosphor without imposing deleterious side effects, such as screen mottle. Methods of preparing and coating said layer are also described.

10 Claims, No Drawings

ALKALI METAL TITANATE REFLECTIVE UNDERLAYER

This is a continuation of application Ser. No. 126,362, filed Mar. 19, 1971, abandoned.

BACKGROUND OF THE INVENTION

1. Field of the Invention

This invention relates to fluorescent screens useful in obtaining x-ray radiographic images such as those intensifying screens used in combination with a silver halide photographic film or fluoroscopic screens for visual examination and others. More particularly this invention comprises screens containing a novel reflective layer comprised of discrete, particulate matter interposed between the base support and the phosphor coating which increases the efficiency of the screen by reflecting more of the incident light.

2. Description of the Prior Art

Intensifying screens are employed to increase the developed density of a sensitized photographic film or plate without increasing the exposure time or the x-ray concentration which is deleterious to the patient's health. It has been well established that when x-ray intensifying screens are fabricated with a transparent or translucent support a substantial proportion of their efficiency or speed is lost due to the fact that luminescent light from the phosphor is lost through said transparent support in a direction opposite to the film. One method commonly used to overcome this deficiency is to interpose a reflective layer containing a pigment such as titanium dioxide ($TiO_2$) admixed with small amounts of an optical brightener such as the aminocoumarins as taught by Patten in British Pat. No. 999,780, issued July 28, 1965. The degree of efficiency of this layer depends directly on the abiliity of the pigment to direct the radiation emanating from the phosphor back to the film.

SUMMARY OF THE INVENTION

An object of this invention is to provide a more efficient reflective layer for use in x-ray intensifying and fluorescent screens. Another object is to provide said screen containing the novel reflective layer of this invention having greater resolving power. Still another object is to provide an efficient method for forming said novel reflective layer without coating defects such as that caused by trapped air bubbles. Still other objects will become apparent from the following description of the invention.

These objects are preferably achieved by providing a screen composed of a suitable support bearing a reflective layer of an alkali metal titanate, such as $K_2O(TiO_2)_6$, pigment dispersed in a suitable binder, such as a chlorosulfonated polyethylene of the type disclosed in U.S. Pat. No. 2,819,183 to Alles, issued Jan. 7, 1958, and a suitable phosphor layer contiguous to said reflective layer. At a given phosphor layer thickness and composition this novel and useful screen provides from 15–20% more screen efficiency than these screens containing the presently used reflective layers such as $TiO_2$ and others. Because of the increased efficiency of this reflective layer a thinner phosphor coating may be used resulting in increased resolving power yielding greater diagnostic information at the same exposure conditions or speed of the screen-film combination. Thus, the surprising superiority of x-ray screens of this invention results in sharper x-ray images and lower patient dosage.

DETAILED DESCRIPTION

The invention comprises a coated sheet support having on at least one surface a phosphor layer and a reflective layer of an alkali metal titanate interposed between said sheet support and said phosphor layer. Alkali metal titanates are described in U.S. Pat. No. 3,129,105 to Berry and Sowards, issued Apr. 14, 1964; U.S. Pat. No. 2,833,620 to Gier and Salzberg, issued May 6, 1958; and U.S. Pat. No. 2,841,470 to Berry, issued July 1, 1958; and their molecular structures and physical properties are detailed 2Alkali metal titanates of the following formulas are included: $M_2O(TLO_2)_n$ wherein M is an alkali metal selected from the group consisting of potassium, sodium, rubidium and cesium, and $n$ is an integer having a value ranging from 2 to 7: $M_2O(TiO_2)_{2n}$ wherein $n$ is an integer 2–3 and M is an alkali metal as described above; and $M_xH_y(o\ (TiO_2)_n)_z$ wherein $x$ equals 1 to 2, $y$ equals 1 to 15, $z$ equals ½(X+Y), $n$ is 6–7, and M is an alkali metal as described above. Potassium titanates are preferred for this invention: they include $K_2O(TiO_2)_6$, $K_2O(TiO_2).4H_2O$, $K_2O(TiO_2)_2$, $K_2O(TiO_2)_5$, $KH_7[O(TiO_2)_6]_4$, $K_2H_{12}[O(TiO_2)_6]_7$ and $K_2(H_3O)_4[O(TiO_2)_6]_3$. Potassium hexatitanate, which has the formula $K_2O(TiO_2)_6$, is particularly preferred. Other alkali metal hexatitanates include $Na_2O(TiO_2)_6$, $Rb_2O(TiO_2)_6$, and $Cs_2O(TiO_2)_6$. The term "potassium titanate is used herein to indicate any potassium titanate, including those set forth above. Preferably, a mixture of 30 to 50% potassium titanate and 70 to 50% binder, by weight, is used for the reflective layer of the coated sheet support, the reflective layer preferably having a thickness of from 0.003 inch to 0.020 inch. As exemplified, the potassium titanate-binder mixture may contain adjuvants. Coated sheet supports having a reflective layer containing potassium titanate are useful as x-ray intensifying and fluorescent screens and provide a surprising improvement over such screens having reflective layers of the prior art.

In a preferred embodiment of this invention, potassium titanate pigment is dispersed using solvents in chlorosulfonated polyethylene in the conventional manner. Suitable wetting or dispersing agents may also be added not only to aid in dispersing the pigment in the binder but also to achieve satisfactory coating of this reflective layer on the screen support which is preferably biaxially oriented polyethylene terephthalate. The mixture of potassium titanate in the binder is preferably thoroughly mixed in a sand-mill mixer and is filtered to remove larger particles and subjected to a vacuum to remove entrained bubbles or air prior to coating. The potassium titanate-binder mixture is coated on the sheet support and dried to form a reflective layer as described above. A phosphor dispersion, preferably calcium tungstate, is then coated on the reflective layer. A protective layer, e.g., of cellulose acetate, may be coated on top of the phosphor layer when it has dried, so as to provide suitable protective qualities to the finished screen and prevent damage during handling.

In place of the polyethylene terephthalate support mentioned above, other supports such as cardboard sized or coated (e.g. with baryta), cellulose acetate and cellulose acetate butyrate, polymethacrylate, polystyrene, polyvinyl chloride, poly(vinyl chloride co vinyl acetate), polyamides or nylon (e.g., polyhexamethyleneadipamide), and metal sheets (e.g., aluminum and aluminum alloys) may be used. The sheet support preferably has a thickness of from 0.00025 inch to 0.30 inch. Flexible polymeric films permeable to x-rays and having a thickness of up to 0.02 inch are preferred for the sheet support.

In place of the calcium tungstate described above there may be substituted known phosphors such as zinc sulfide, zinc oxide and calcium silicate, zinc phosphate, alkali halides, cadmium sulfide, cadmium selenide, zinc selenide, zinc telluride, cadmium telluride, cadmium tungstate, magnesium fluoride, zinc fluoride, strontium sulfide, zinc sulfate, barium lead sulfate, and mixtures thereof. Phosphors mentioned above whose efficiency has been increased by the addition of doping agents such as europium may also be used. The phosphor layer preferably has a thickness of from 0.004 to 0.014 inch. The term "phosphor" is used herein to denote any suitable phosphor that luminesces upon exposure to x-rays, such as those set forth above.

The coated sheet support of this invention may contain an exterior protective layer contiguous to the phosphor layer as described in U.S. Pat. No. 2,907,882 to Patten, issued Oct. 6, 1959.

The particle sizes of the materials used in the various layers of the coated sheet support will generally depend on the extent to which they are milled in their preparation. Suitable particle sizes will be apparent to those in the art.

The invention is further illustrated but is not intended to be limited by the following examples.

EXAMPLE I

A reflective suspension is prepared by passing a mixture of the following ingredients through a sand-mill or by mixing in a ball-mill for 16 to 48 hours:

| | |
|---|---|
| Potassium hexatitanate, $K_2O(TiO_2)_6$ | 100.0 grams |
| Chlorosulfonated polyethylene | 60.0 grams |
| n-Butyl acetate | 186.9 grams |
| Mixed petroleum naphtha | 125.2 grams |
| Dioctyl ester of sodium sulfosuccinic acid | 2.0 grams |
| Polymeric organic silicone fluid | 3.0 grams |

The chlorosulfonated polyethylene contains 27.5% chlorine and 1.5% sulfur, the sulfur being present as $—SO_2Cl$ groups, as disclosed in U.S. Pat. No. 2,819,183, Col. 2, lines 42-52. The polymeric organic silicone fluid is a 2% by weight in toluene solution having a specific gravity of 0.964-0.969 at 20°C. and a viscosity of 4 to 40 centistokes at 25°C. as determined with an Oswald viscometer. The mixed petroleum naphtha has an initial boiling of 247°F., an API grade of 59–61 at 60°F., and a specific gravity of 0.7385.

The milled suspension is filtered through a filtering medium with an average pore-size of 30 microns. The suspension is placed in a container to which vacuum is applied for a period of 20 to 30 minutes and then coated at a wet thickness of 0.010 inch, on a 0.010 inch thick sheet of biaxially oriented polyethylene terephthalate film provided with a substratum of vinylidene chloride-methylacrylate-itaconic acid copolymer prepared as described in U.S. Pat. No. 2,698,240 to Alles and Saner, issued Dec. 28, 1954. A reflective layer having a dry thickness of about 0.0012 inch is obtained.

After drying at b 70°–75°F., there is coated on the reflective layer at a wet thickness of 0.033 inch, a suspension of the following composition which had been milled for 24 hours:

| | |
|---|---|
| n-Butyl acetate | 586.5 grams |
| n-Propanol | 140.8 grams |
| Polymeric organic silicone fluid as used in the reflective suspension | 16.1 grams |
| Potassium salt of monoethylphenylphenol monosulfonic acid | 4.3 grams |
| Glycerol monolaurate | 26.8 grams |
| Polyvinyl butyral (granular, intrinsic viscosity 0.81) | 118.8 grams |
| Calcium tungstate phosphor | 2200.0 grams |

This coating provided a phosphor layer having a dry thickness of 0.0096 inch.

On the dried phosphor dispersion layer there was coated the following solution:

| | |
|---|---|
| Cellulese acetate (acetyl content of 55.8%) | 270 grams |
| Urea formaldehyde resin (60% solids solution in a mixture of 1 part xylene and 1.5 parts butanol of a butylated urea formaldehyde resin made according to Edgar and Robinson, U.S. Patent 2,191,957, issued February 27, 1940). | 50 grams |
| Acetone | 2676 grams | which provided a protective layer having a thicknes of 0.0006 inch. The efficiency of the x-ray intensifying screen so produced was compared to one containing a titanium dioxide reflective layer in place of the $K_2O(TiO_2)_6$ reflective layer of Example I by the testing method described by Patten in British Pat. No. 999,780, Col. 4, line 55 - Col. 5, line 68. The screen of Example I had an efficiency 1.15 times greater than the $TiO_2$ screen and a resolving power of 0.5 lines/mm more.

EXAMPLE II

X-ray intensifying screens were prepared as above except that the phosphor coating had the following composition:

| | |
|---|---|
| n-Butyl acetate | 891.5 grams |
| Ethanol | 222.9 grams |
| Polymeric organic silicone fluid of Ex. I | 20.0 grams |
| Potassium salt of monoethylphenylphenol monosulfonic acid | 6.2 grams |
| Glycerol monolaurate | 15.6 grams |
| Polyvinyl butyral (granular, intrinsic viscosity 0.81) | 156.0 grams |
| Barium sulfate/lead sulfate phosphor | 2080.0 grams |

The suspension was coated at a wet thickness of 0.032 inch to provide a dry thickness of 0.007 inch. Screens so prepared had an efficiency of 1.15 compared to 1.00 for conventional titanium dioxide reflective layers.

EXAMPLE III

A milled reflective suspension of $K_2O(TiO_2)_6$ was prepared and filtered as in Example I, but was not evacuated. It was then split into 3 portions. The first portion was used to coat a screen immediately after preparation and without further treatment. The second portion was held 2 days at room temperature prior to screen coating and the third held 6 days at room temperature prior to coating. All were coated on sheets of polyethylene terephthalate and dried prior to applying the phosphor layers and protective layers as in Example I. The phosphor layers coating the first two screens contained bubbles which interfered with screen quality while that coated with the reflective suspension that had been held 6 days was free of the bubbling defect and produced a screen with an efficiency of about 1.15 compared to 1.00 for a conventional screen. Thus, it has been found that applying a vacuum to the filtered reflective suspension or allowing it to age for a period of time prior to coating provides a bubble-free reflective layer.

We claim:

1. An x-ray intensifying or fluorescent screen comprising a coated sheet support selected from a cardboard, polymeric or metal sheet having on at least one surface a phosphor layer comprised of at least one metal-containing x-ray phosphor and a reflective layer comprised of at least 30% by weight of an alkali metal titanate interposed between said sheet support and said phosphor layer.

2. An x-ray intensifying screen of claim 1, wherein said alkali metal titanate is a potassium titanate.

3. An x-ray intensifying screen of claim 2, wherein said potassium titanate is $K_2O(TiO_2)_6$.

4. An x-ray intensifying screen of claim 2, wherein said reflective layer is a mixture of potassium titanate and a binder.

5. An x-ray intensifying screen according to claim 4, wherein the sheet support has a thickness of from 0.00025 inch to 0.30 inch, said reflective layer has a thickness of from 0.0003 to 0.020 inch, and said phosphor layer has a thickness of from 0.004 to 0.014 inch.

6. An x-ray intensifying screen according to claim 5, wherein said potassium titanate is $K_2O(TiO_2)_6$.

7. An x-ray intensifying screen according to claim 6, wherein said reflective layer comprises a mixture of 30 to 50% $K_2O(TiO_2)_6$ and 70 to 50% of binder, by weight.

8. An x-ray intensifying screen according to claim 4, wherein said reflective layer comprises a mixture of 30 to 50% potassium titanate and 70 to 50% binder, by weight.

9. An x-ray intensifying screen according to claim 7, wherein said binder comprises a chlorosulfonated polyethylene acetate.

10. An x-ray intensifying screen according to claim 5, wherein said sheet support is a flexible, polymeric film having a thickness of from 0.00025 inch to 0.02 inch.

* * * * *